US006892846B2

United States Patent
Mellot et al.

(10) Patent No.: US 6,892,846 B2
(45) Date of Patent: May 17, 2005

(54) FOUR-WHEEL DRIVE ASSIST FOR ELECTRIC MACHINES

(75) Inventors: Lex A. Mellot, Warfordsburg, PA (US); Ignacy Puszkiewicz, Smithsburg, MD (US)

(73) Assignee: JLG Industries, Inc., McConnellsburg, PA (US)

(*) Notice: Subject to any disclaimer, the term of this patent is extended or adjusted under 35 U.S.C. 154(b) by 0 days.

(21) Appl. No.: 10/275,003

(22) PCT Filed: Apr. 30, 2001

(86) PCT No.: PCT/US01/13657
§ 371 (c)(1),
(2), (4) Date: Dec. 9, 2002

(87) PCT Pub. No.: WO01/83251
PCT Pub. Date: Nov. 8, 2001

(65) Prior Publication Data
US 2004/0074687 A1 Apr. 22, 2004

Related U.S. Application Data

(60) Provisional application No. 60/201,300, filed on May 2, 2000.

(51) Int. Cl.[7] .............................................. B60K 17/356
(52) U.S. Cl. ...................... 180/243; 180/197; 180/65.2; 180/305; 180/308
(58) Field of Search ................................ 180/197, 65.2, 180/242, 243, 305, 308

(56) References Cited

U.S. PATENT DOCUMENTS

| 849,149 A | 4/1907 | Ledwinka |
|---|---|---|
| 3,057,427 A | 10/1962 | Glasgow |
| 3,916,625 A | * 11/1975 | Holtkamp ..................... 60/421 |
| 4,133,403 A | * 1/1979 | Priddy et al. .............. 180/65.2 |
| 4,528,871 A | * 7/1985 | Nembach ................... 74/733.1 |
| 4,570,741 A | * 2/1986 | McCoy ....................... 180/242 |
| 4,651,846 A | 3/1987 | Headrick |
| 4,883,141 A | 11/1989 | Walker |
| 5,064,013 A | 11/1991 | Lenz |
| 5,199,525 A | 4/1993 | Schueler |
| 5,368,120 A | * 11/1994 | Sakai et al. ................. 180/197 |
| 5,465,806 A | 11/1995 | Higasa et al. |
| 5,775,453 A | 7/1998 | Williams et al. |
| 5,788,005 A | 8/1998 | Arai |
| 5,810,106 A | 9/1998 | McCoy |
| 6,073,716 A | 6/2000 | Ellertson et al. |

* cited by examiner

Primary Examiner—Lesley D. Morris
Assistant Examiner—Tony Winner
(74) Attorney, Agent, or Firm—Nixon & Vanderhye P.C.

(57) ABSTRACT

A four-wheel drive assist for electric machines includes an electric drive system for driving wheels at a non-steering end and a selectively operable hydraulic system for driving wheels at a steering end. A controller controls the operation of the drive system according to operator selection and/or by detecting slipping of the electric drive system. Preferably, at least one hydraulically driven operating arm, including boom functions, lift platform, etc., is driven by the same hydraulic pump that drives the steering end hydraulic system. The machine thus is capable of effecting four-wheel drive when necessary, while operating as efficiently as a conventional two-wheel drive full electric machine when the four-wheel drive system is not engaged.

17 Claims, 1 Drawing Sheet

FOUR-WHEEL DRIVE ASSIST FOR ELECTRIC MACHINES

CROSS-REFERENCES TO RELATED APPLICATIONS

This application is the U.S. national phase of International PCT Application No. PCT/US01/13657, filed Apr. 30, 2001, which designated the United States. PCT/US01/13657 claims priority of U.S. Provisional Patent Application Ser. No. 60/210,300, filed May 2, 2000. The entire contents of these applications are incorporated herein by reference.

BACKGROUND OF THE INVENTION

The present invention relates to drive systems for electric machines and, more particularly, to a four-wheel drive assist incorporating a hydraulic drive for the steering end wheels that is automatically engaged when slipping is sensed or that is selectively engaged by an operator. The system has been developed to produce an electric machine that operates efficiently in an indoor environment while having the ability to operate in an outdoor construction environment, where more terrainability is required.

It is known that the most efficient drive on a battery-powered machine is through the use of an electric motor and gear reduction. This construction is easily installed on the non-steering end of a machine. However, because of the physical length of such a drive, it is impractical on the steering end of a unit where it has to swing through an arc.

Conventional four-wheel drive boom lifts are internal combustion engine powered. The engine drives a pump, which in turn drives four hydraulic drives. The drives are hydraulically connected through flow dividers, which distribute power appropriately to the four wheels. This type of machine achieves its maximum tractive effort by summing the power of all four wheels, providing power to negotiate grades and rough terrain. Much of the time, however, these units operate on smooth or at least improved surfaces, where the performance of full-time four-wheel drive is not required. On the smooth or improved surfaces, the valving and extra motors cause losses in efficiency. The devices which in rough terrain are used to distribute power further reduce efficiency when steering and driving on improved surfaces.

A conventional hydraulic drive fits well and easily on the steering end. A conventional drive, however, reduces efficiency in conditions where four-wheel drive is not required, due to the pumping losses through the motor and hosing.

BRIEF SUMMARY OF THE INVENTION

With the four-wheel drive assist according to the invention, the primary drive is a conventional electric drive (electric motor and gear reductions) located on the non-steering end of the machine.

On the steering end of the machine, two direct drive, radial piston motors are installed. In this motor design, torque is produced whenever hydraulic pressure forces pistons against an internal cam ring causing rotation. This type of drive motor is very compact.

Because the pistons ride on but are not connected mechanically to the cam ring, when pressure is removed from the motor, the pistons are free to float back to the retracted position. In this condition, because pistons do not contact cam rings, there is no pumping of oil, or drag by component contact. Thus, whenever the four-wheel drive is not engaged, the unit operates as efficiently as a conventional two-wheel drive, full electric machine.

Hydraulic power is provided to the front-wheel drive by the electrically driven hydraulic pump, which also powers at least one hydraulically driven operating arm, such as the boom functions, a lift platform, etc. Power is divided across the front drive via a gear type flow divider. Whenever both front wheels have traction with the ground, the power is divided equally. Should either front wheel lose traction, the pressure in that leg of the drive is applied across the one gear of the flow divider, producing additional torque on the gear on the side with traction. This causes pressure intensification on that side so that more than 50% of torque is applied to the wheel with traction. The flow divider hydraulically is located between the pump and the two directional control valves, providing that the above performance can be effected in forward and reverse directions.

In an exemplary embodiment of the invention, an electric motor driven lift machine includes a vehicle chassis supporting a plurality of wheels and at least one hydraulically-driven operating arm. At least one electric motor is coupled with a first set of the plurality of wheels for driving the first set of wheels, and at least one hydraulic motor is coupled with a second set of the plurality of wheels for selectively driving the second set of wheels. A hydraulic pump driven by a pump motor is coupled with a source of hydraulic fluid. The hydraulic pump is in fluid communication with the hydraulic motor and the hydraulically-driven operating arm. The vehicle chassis preferably supports four wheels, wherein the first set and the second set of the plurality of wheels each includes two of the four wheels. In this context, the electric motor driven lift machine includes two hydraulic motors respectively coupled with each of the second set of the plurality of wheels. A flow divider may be provided in fluid communication with the hydraulic pump that divides hydraulic fluid flow between each of the second set of wheels. A traction sensor may be provided that detects whether one of the wheels in the second set of wheels loses traction. The traction sensor communicates with the flow divider, which applies a higher pressure to the other of the second set of wheels according to a signal from the traction sensor. In a preferred arrangement, the first set of the plurality of wheels includes non-steering wheels of the machine, and the second set of the plurality of wheels includes steering wheels of the machine. A slip sensor may be coupled with the first set of the plurality of wheels that detects a slipping condition of the first set of wheels and activates the hydraulic pump upon a slipping detection. The slip sensor may be an RPM sensor. Alternatively or additionally, an operator actuated switch may be coupled with the hydraulic pump for activating the hydraulic pump.

In accordance with another exemplary embodiment of the invention, an electric motor driven machine includes a vehicle chassis supporting a plurality of wheels, at least one electric motor coupled with a first set of the plurality of wheels for driving the first set of wheels, at least one hydraulic motor coupled with a second set of the plurality of wheels for selectively driving the second set of wheels, a hydraulic pump driven by a pump motor and coupled with a source of hydraulic fluid, and a slip sensor coupled with the first set of the plurality of wheels that detects a slipping condition of the first set of wheels and communicates the slipping condition to the hydraulic pump to activate the hydraulic pump. The hydraulic pump is in fluid communication with the at least one hydraulic motor.

In yet another exemplary embodiment of the invention, a method of operating an electric motor driven lift machine includes driving the first set of a plurality of wheels with the at least one electric motor, selectively driving the second set of the plurality of wheels with the at least one hydraulic motor via the hydraulic pump, and driving the hydraulically-driven operating arm according to operator control via the hydraulic pump. The method may include the steps of detecting a slipping condition of the first set of the plurality of wheels and driving the second set of the plurality of wheels according to the detected first set slipping condition.

BRIEF DESCRIPTION OF THE DRAWINGS

These and other aspects and advantages of the present invention will be described in detail with reference to the accompanying drawing, in which.

DETAILED DESCRIPTION OF PREFERRED EMBODIMENTS

Figure 1:
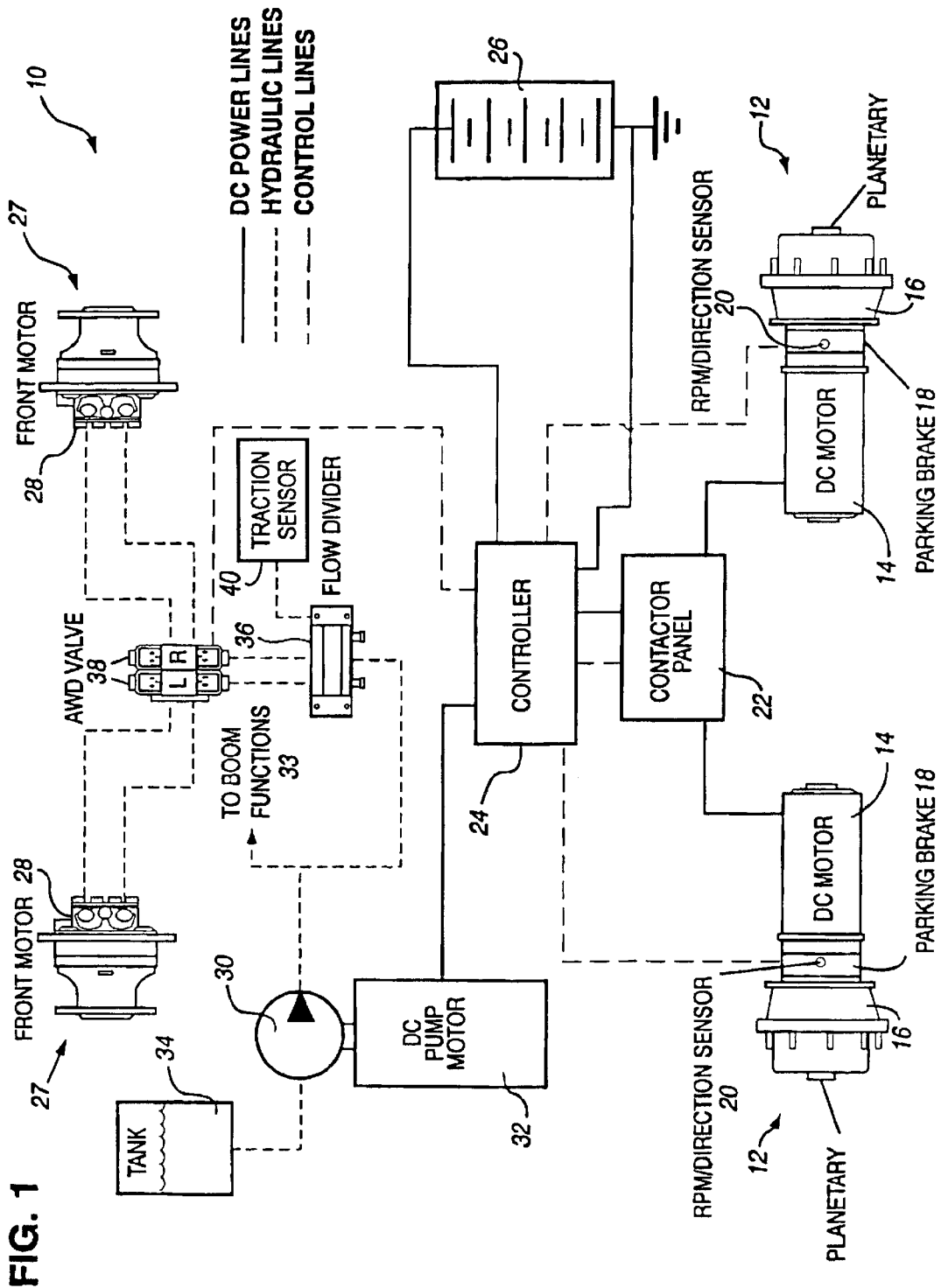
FIG. 1 is a schematic illustration of the four-wheel drive assist system according to the present invention.

FIG. 1 is a schematic illustration of a vehicle that incorporates the four-wheel drive assist system according to the present invention. In the illustrated arrangement, the front wheels are steering wheels, and the rear wheels are non-steering wheels. The arrangement could be reversed, however, and the invention is not meant to be limited to the illustrated example.

Referring to the FIGURE, a vehicle chassis 10 including a four-wheel drive assist system supports rear wheels 12 driven by respective electric motors 14, such as DC motors, via a gear reducer 16. Each wheel also includes a parking brake 18 and an RPM/direction sensor 20. A contactor panel 22 includes relays for main disconnect, forward-reverse switching, and traction control for the electric motors 14.

A controller 24 is coupled with a power source 26 such as a battery. During normal operation, when traveling over smooth or improved surfaces, full-time four-wheel drive is not required. In accordance with the arrangement of the present invention, under normal driving conditions on smooth or improved surfaces, the controller 24 effects drive of only the rear wheels 12.

The system 10 includes provisions for driving front wheels 27 of the vehicle. A direct drive hydraulic radial piston motor 28 drives each of the front wheels 27. The specific structure of the hydraulic motors 28 is known, and any suitable construction could be used. The details of the structure and operation of the hydraulic motors 28 will thus not be further described. Generally, however, with this motor design, torque is produced whenever hydraulic pressure forces pistons against an internal cam ring causing rotation. A hydraulic pump 30 is driven by a pump motor 32, such as a DC pump motor, and is coupled to a source of hydraulic fluid 34. The power is divided across the front drive via a gear type flow divider 36 and to the hydraulic motors 28 via directional control valves 38. Gear type flow divider 36 assures that wheels are rotating with the same speed and in case one of the wheels would slip, transfers torque to the wheel which has traction. By activation of the valves 38, it is possible to synchronize direction of rotation of the hydraulic motors 28 with direction of rotation of rear wheels 12.

When the controller 24 senses that the rear wheels 12 are slipping via sensors 20, the controller 24 activates the front wheel 27 drive system by driving the pump motor 32 across the flow divider 36 and valves 38 to drive the hydraulic motors 28. The system may alternatively or additionally be capable of effecting four-wheel drive via operator selection.

In a boom lift or like apparatus, the pump motor 32 is the same motor that drives the boom or lift functions 33. The flow divider 36 divides hydraulic power across the front drive according to the amount of traction on the respective wheels 27. Whenever both front wheels 27 have traction with the ground, the power is divided equally. Should either front wheel lose traction, which is detected via a traction sensor 40 and communicated to the flow divider 36. the pressure in that leg of the drive is applied across the one gear of the flow divider 36. This produces additional torque on the gear on the side with traction. As a result, a pressure intensification occurs on that side so that more than 50% of the torque is applied to the wheel with traction. As shown, the flow divider 36 is hydraulically located between the pump 30 and the two directional control valves 38, providing for performance in forward and reverse directions.

Because the pistons of hydraulic motors 28 ride on but are not connected mechanically to the cam ring, when pressure is removed from the motor, the pistons are free to flow back to a retracted position. In this condition, because the pistons do not contact cam rings, there is no pumping of oil or drag by component contact. Thus, when the four-wheel drive system is not engaged, the unit operates as efficiently as a conventional two-wheel drive full electric machine.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. An electric motor driven lift machine comprising:

a vehicle chassis supporting four wheels and at least one hydraulically driven operating arm;

at least one electric motor coupled with a first set of the plurality of wheels for driving the first set of the plurality of wheels;

at least one hydraulic motor coupled with a second set of the plurality of wheels for selectively driving the second set of the plurality of wheels, wherein the first set and the second set of the plurality of wheels each comprises two of the four wheels, the electric motor driven lift machine including two hydraulic motors respectively coupled with each of the second set of the plurality of wheels;

a hydraulic pump driven by a pump motor and coupled with a source of hydraulic fluid, the hydraulic pump being in fluid communication with the at least one hydraulic motor and the at least one hydraulically driven operating arm, wherein the pump motor is separate from the at least one electric motor;

a flow divider in fluid communication with the hydraulic pump, the flow divider dividing hydraulic fluid flow between each of the second set wheels of the plurality of wheels; and a traction sensor that detects whether one of the wheels in the second set of the plurality of wheels loses traction, the traction sensor communicating with the flow divider, wherein the flow divider applies a higher pressure to the other of the second set wheels of the plurality of wheels according to a signal from the traction sensor.

2. An electric motor driven lift machine according to claim 1, wherein the first set of the plurality of wheels comprises non-steering wheels of the machine, and wherein the second set of the plurality of wheels comprises steering wheels of the machine.

3. An electric motor driven lift machine comprising:
a vehicle chassis supporting four wheels and at least one hydraulically driven operating arm;
at least one electric motor coupled with a first set of the plurality of wheels for driving the first set of the plurality of wheels;
at least one hydraulic motor coupled with a second set of the plurality of wheels for selectively driving the second set of the plurality of wheels, wherein the first set and the second set of the plurality of wheels each comprises two of the four wheels, the electric motor driven lift machine including two hydraulic motors respectively coupled with each of the second set of the plurality of wheels;
a hydraulic pump driven by a pump motor and coupled with a source of hydraulic fluid, the hydraulic pump being in fluid communication with the at least one hydraulic motor and the at least one hydraulically driven operating arm, wherein the pump motor is separate from the at least one electric motor; and
a flow divider in fluid communication with the hydraulic pump, the flow divider dividing hydraulic fluid flow between each of the second set wheels of the plurality of wheels, wherein the flow divider is hydraulically disposed between the hydraulic pump and a pair of directional control valves respectively coupled with each of the hydraulic motors.

4. An electric motor driven lift machine comprising:
a vehicle chassis supporting a plurality of wheels and at least one hydraulically driven operating arm;
at least one electric motor coupled with a first set of the plurality of wheels for driving the first set of the plurality of wheels;
at least one hydraulic motor coupled with a second set of the plurality of wheels for selectively driving the second set of the plurality of wheels;
a hydraulic pump driven by a pump motor and coupled with a source of hydraulic fluid, the hydraulic pump being in fluid communication with the at least one hydraulic motor and the at least one hydraulically driven operating arm, wherein the pump motor is separate from the at least one electric motor; and
a slip sensor coupled with the first set of the plurality of wheels, the slip sensor detecting a slipping condition of the first set of the plurality of wheels and activating the hydraulic pump upon a slipping detection.

5. An electric motor driven lift machine according to claim 4, wherein the slip sensor comprises an RPM sensor.

6. An electric motor driven lift machine comprising:
a vehicle chassis supporting a plurality of wheels and at least one hydraulically driven operating arm;
at least one electric motor coupled with a first set of the plurality of wheels for driving the first set of the plurality of wheels;
at least one hydraulic motor coupled with a second set of the plurality of wheels for selectively driving the second set of the plurality of wheels;
a hydraulic pump driven by a pump motor and coupled with a source of hydraulic fluid, the hydraulic pump being in fluid communication with the at least one hydraulic motor and the at least one hydraulically driven operating arm, wherein the pump motor is separate from the at least one electric motor; and
an operator actuated switch coupled with the hydraulic pump, the switch activating the hydraulic pump.

7. An electric motor driven machine comprising:
a vehicle chassis supporting a plurality of wheels;
at least one electric motor coupled with a first set of the plurality of wheels for driving the first set of the plurality of wheels;
at least one hydraulic motor coupled with a second set of the plurality of wheels for selectively driving the second set of the plurality of wheels;
a hydraulic pump driven by a pump motor and coupled with a source of hydraulic fluid, the hydraulic pump being in fluid communication with the at least one hydraulic motor, wherein the pump motor is separate from the at least one electric motor; and
a slip sensor coupled with the first set of the plurality of wheels, the slip sensor detecting a slipping condition of the first set of the plurality of wheels and communicating the slipping condition to the hydraulic pump to activate the hydraulic pump.

8. An electric motor driven machine according to claim 7, further comprising an operator actuated switch coupled with the hydraulic pump, the switch activating the hydraulic pump.

9. An electric motor driven machine according to claim 7, wherein the vehicle chassis supports four wheels, and wherein the first set and the second set of the plurality of wheels each comprises two of the four wheels, the electric motor driven machine including two hydraulic motors respectively coupled with each of the second set of the plurality of wheels.

10. An electric motor driven machine according to claim 9, wherein the first set of the plurality of wheels comprises non-steering wheels of the machine, and wherein the second set of the plurality of wheels comprises steering wheels of the machine.

11. An electric motor driven machine according to claim 9, further comprising a flow divider in fluid communication with the hydraulic pump, the flow divider dividing hydraulic fluid flow between each of the second set wheels of the plurality of wheels.

12. An electric motor driven machine according to claim 11, further comprising a traction sensor that detects whether one of the wheels in the second set of the plurality of wheels loses traction, the traction sensor communicating with the flow divider, wherein the flow divider applies a higher pressure to the other of the second set wheels of the plurality of wheels according to a signal from the traction sensor.

13. An electric motor driven machine according to claim 11, wherein the flow divider is hydraulically disposed between the hydraulic pump and a pair of directional control valves respectively coupled with each of the hydraulic motors.

14. A method of operating an electric motor driven lift machine, the machine including a vehicle chassis supporting a plurality of wheels and at least one hydraulically driven operating arm, at least one electric motor coupled with a first set of the plurality of wheels, at least one hydraulic motor coupled with a second set of the plurality of wheels, and a hydraulic pump driven by a pump motor and coupled with a source of hydraulic fluid, the hydraulic pump being in fluid communication with the at least one hydraulic motor and the at least one hydraulically driven operating arm, wherein the pump motor is separate from the at least one electric motor, the method comprising:
driving the first set of the plurality of wheels with the at least one electric motor;
selectively driving the second set of the plurality of wheels with the at least one hydraulic motor via said hydraulic pump;

detecting a slipping condition of the first set of the plurality of wheels and driving the second set of the plurality of wheels according to the detected first set slipping condition; and driving the hydraulically driven operating arm according to operator control via said hydraulic pump.

15. A method according to claim 14, wherein the step of selectively driving the second set of the plurality of wheels comprises driving the second set of the plurality of wheels according an operator selected switch.

16. A method of operating an electric motor driven lift machine, the machine including a vehicle chassis supporting a plurality of wheels and at least one hydraulically driven operating arm, at least one electric motor coupled with a first set of the plurality of wheels, at least one hydraulic motor coupled with a second set of the plurality of wheels, and a hydraulic pump driven by a pump motor and coupled with a source of hydraulic fluid, the hydraulic pump being in fluid communication with the at least one hydraulic motor and the at least one hydraulically driven operating arm, wherein the pump motor is separate from the at least one electric motor, wherein the vehicle chassis supports four wheels, and wherein the first set and the second set of the plurality of wheels each comprises two of the four wheels, the electric motor driven lift machine including two hydraulic motors respectively coupled with each of the second set of the plurality of wheels, the method comprising:

driving the first set of the plurality of wheels with the at least one electric motor;

selectively driving the second set of the plurality of wheels with the at least one hydraulic motor via said hydraulic pump;

driving the hydraulically driven operating arm according to operator control via said hydraulic pump; and detecting whether one of the wheels in the second set of the plurality of wheels loses traction, and applying a higher pressure to the other of the second set wheels of the plurality of wheels according to the traction detection, wherein the step of selectively driving the second set of the plurality of wheels comprises dividing hydraulic fluid flow between each of the second set wheels of the plurality of wheels.

17. A method of operating an electric motor driven lift machine, the machine including a vehicle chassis supporting a plurality of wheels and at least one hydraulically driven operating arm, at least one electric motor coupled with a first set of the plurality of wheels, at least one hydraulic motor coupled with a second set of the plurality of wheels, and a hydraulic pump driven by a pump motor and coupled with a source of hydraulic fluid, the hydraulic pump being in fluid communication with the at least one hydraulic motor and the at least one hydraulically driven operating arm, wherein the pump motor is separate from the at least one electric motor, wherein the vehicle chassis supports four wheels, and wherein the first set and the second set of the plurality of wheels each comprises two of the four wheels, the electric motor driven lift machine including two hydraulic motors respectively coupled with each of the second set of the plurality of wheels, the method comprising:

driving the first set of the plurality of wheels with the at least one electric motor;

selectively driving the second set of the plurality of wheels with the at least one hydraulic motor via said hydraulic pump;

driving the hydraulically driven operating arm according to operator control via said hydraulic pump; and hydraulically disposing a flow divider between the hydraulic pump and a pair of directional control valves respectively coupled with each of the hydraulic motors, wherein the step of selectively driving the second set of the plurality of wheels comprises dividing hydraulic fluid flow between each of the second set wheels of the plurality of wheels.

* * * * *